United States Patent
Zettel et al.

(10) Patent No.: US 7,974,749 B2
(45) Date of Patent: Jul. 5, 2011

(54) BELT SLIP DIAGNOSTIC SYSTEM FOR ACCESSORY AND HYBRID ELECTRIC DRIVES

(75) Inventors: Andrew M. Zettel, Ann Arbor, MI (US); John F. Van Gilder, Webberville, MI (US); Rick H. Schroeder, Lapeer, MI (US); Michael J. Taljonick, Davison, MI (US); Christopher J. Dobies, Beverly Hills, MI (US)

(73) Assignee: GM Global Technology Operations LLC

( * ) Notice: Subject to any disclaimer, the term of this patent is extended or adjusted under 35 U.S.C. 154(b) by 765 days.

(21) Appl. No.: 11/807,603

(22) Filed: May 29, 2007

(65) Prior Publication Data

US 2008/0021603 A1    Jan. 24, 2008

Related U.S. Application Data

(60) Provisional application No. 60/832,386, filed on Jul. 21, 2006.

(51) Int. Cl.
*G01M 17/00* (2006.01)

(52) U.S. Cl. .......... 701/29; 701/22; 123/339.15

(58) Field of Classification Search .......... 701/29, 701/22, 51, 86; 903/942; 123/339.15
See application file for complete search history.

(56) References Cited

U.S. PATENT DOCUMENTS

| | | | |
|---|---|---|---|
| 5,855,108 A * | 1/1999 | Salz et al. | 56/10.2 G |
| 6,376,927 B1 | 4/2002 | Tamai et al. | |
| 6,616,569 B2 | 9/2003 | Hoang et al. | |
| 6,803,747 B2 * | 10/2004 | Taniguchi et al. | 322/28 |
| 6,823,840 B1 | 11/2004 | Tamai et al. | |
| 2005/0263121 A1 * | 12/2005 | Tamagawa et al. | 123/179.3 |
| 2006/0287146 A1 | 12/2006 | McVicar et al. | |

* cited by examiner

*Primary Examiner* — Mark Hellner
*Assistant Examiner* — Helal A Algahaim

(57) ABSTRACT

A diagnostic system for a vehicle includes a first sensor that generates a first status signal, which is indicative of an engine speed of an engine. A second sensor generates a second status signal that is indicative of an actual accessory speed of an accessory. The accessory is coupled to the engine via a belt system. A control module determines an expected accessory speed based on the engine speed and determines a residual accessory speed based on the expected and actual accessory speeds. The control module also detects a fault in the belt system based on the residual accessory speed.

21 Claims, 4 Drawing Sheets

BELT SLIP DIAGNOSTIC SYSTEM FOR ACCESSORY AND HYBRID ELECTRIC DRIVES

RELATED APPLICATION

This application claims the benefit of U.S. Provisional Application No. 60/832,386, filed on Jul. 21, 2006. The disclosure of the above application is incorporated herein by reference in its entirety.

FIELD

The present disclosure relates to accessory drive systems and mechanical, electrical and/or hybrid electric vehicle propulsion systems and more particularly to diagnostic systems for the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid vehicles, as compared to standard vehicles that are driven by an internal combustion engine (ICE), can provide improved fuel economy and reduced emissions. Hybrid electric vehicles achieve high fuel mileage by combining a battery-powered electric motor-generator (MG) with a highly efficient heat engine, typically an ICE. Parallel hybrid electric vehicles use power from both the heat engine and the electric engine to drive the wheels of the vehicle.

During varying driving conditions, hybrid vehicles alternate between separate power sources, depending on operating efficiencies of each power source. For example, a hybrid electric vehicle may alternate between an ICE and an MG. The ICE may be shut down during a stopped or idle condition, while the MG is used for propulsion. The ICE may be restarted when an increase in power is demanded. The shut down of the ICE conserves on fuel usage.

An on-board engine computer controls when the ICE and the MG are used to achieve peak efficiencies under different driving conditions. The MG may function both as a motor, delivering torque to the drive wheels, and as a generator, powering a vehicle electrical system and charging vehicle batteries. When the MG is functioning as a generator, the MG may be powered by the ICE or from the wheels of the vehicle. When powered by the ICE a belt is often used to transfer rotational energy from the ICE to the MG. The belt may also be used by the MG to reduce the speed of the ICE, referred to as braking the engine, and to start the ICE.

The belt can slip on pulleys that are coupled to the ICE and the MG. Belt slippage can negatively affect powertrain operating performance and emission performance of a hybrid vehicle. Belt slippage can be due to a frayed or worn belt, an improperly installed or tensioned belt, an improperly functioning tensioner, a warn or defective pulley, an out-of-alignment between pulleys, an improperly installed tensioner, etc.

SUMMARY

Accordingly, a diagnostic system is provided for a vehicle that includes a first sensor that generates a first status signal, which is indicative of an engine speed of an engine. A second sensor generates a second status signal that is indicative of an actual accessory speed of an accessory. The accessory is coupled to the engine via a belt system. A control module determines an expected accessory speed based on the engine speed and determines a residual accessory speed based on the expected and actual accessory speeds. The control module also detects a fault in the belt system based on the residual accessory speed.

In other features, a diagnostic method for a vehicle is provided and includes generating a first status signal that is indicative of an engine speed of an engine. A second status signal is generated that is indicative of an actual accessory speed of an accessory, which is coupled to the engine via a belt system. An expected accessory speed is determined based on the engine speed. A residual accessory speed is determined based on the expected and actual accessory speeds. A fault in a belt system is detected based on the residual accessory speed.

In yet other features, a hybrid vehicle system is provided and includes an engine and an accessory that is coupled to the engine via a belt system. A first sensor generates a first status signal that is indicative of an engine speed of the engine. A second sensor generates a second status signal that is indicative of an actual accessory speed of the accessory. A control module determines an expected accessory speed based on the engine speed, determines a residual accessory speed based on the expected and actual accessory speeds, and generates a weighted residual accessory speed value based on the residual accessory speed. The control module also filters the weighted residual accessory speed value and detects a fault in the belt system based on the filtered weighted residual accessory speed.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

Figure 1:
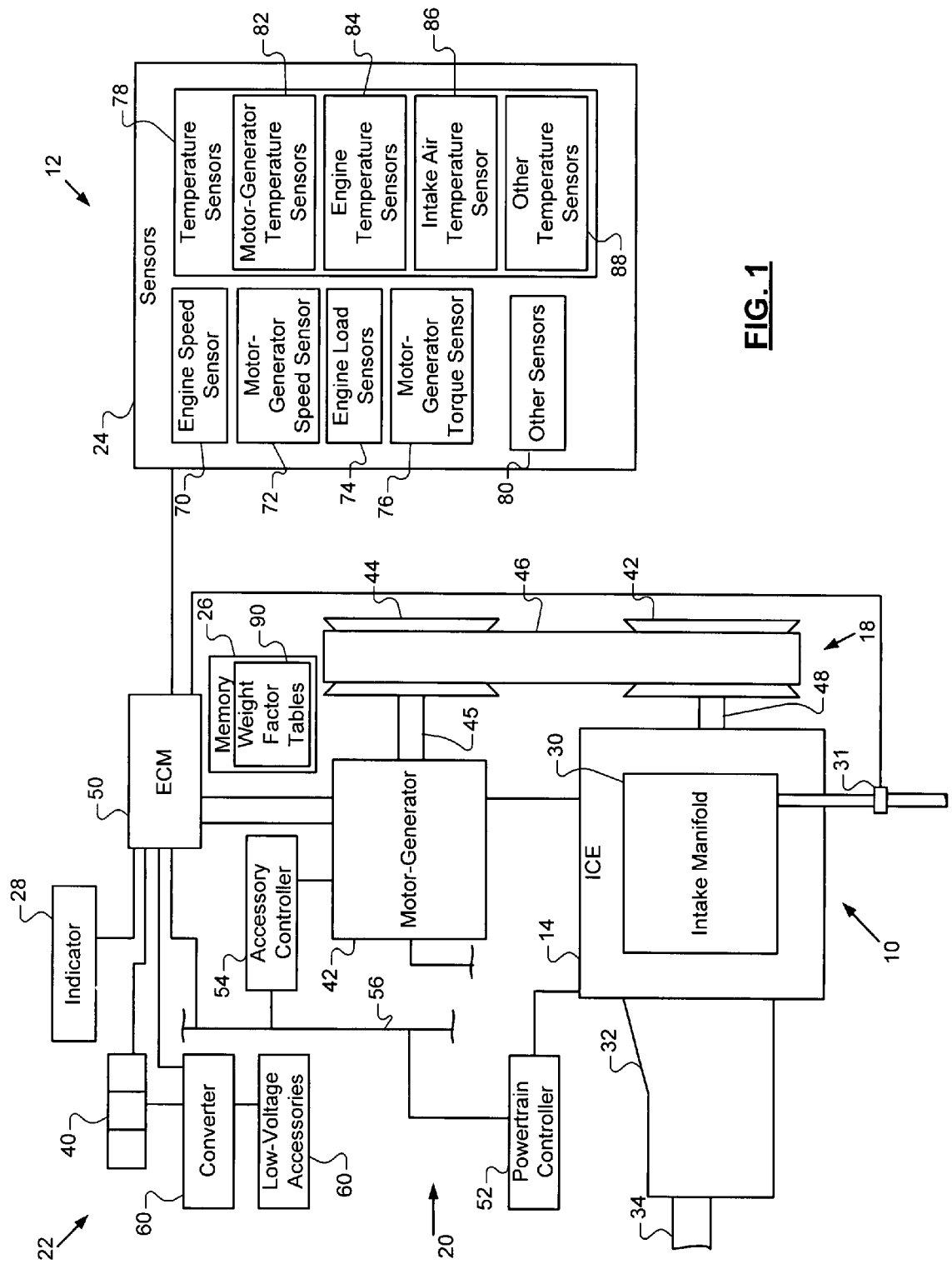
FIG. 1 is a functional block diagram of hybrid electric vehicle propulsion system incorporating a diagnostic system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The embodiments disclosed herein include methods and systems for diagnosis of belt system faults for accessory drive systems and mechanical, electrical and/or hybrid electric vehicle propulsion systems. Example hybrid powertrain systems are disclosed in: U.S. Pat. No. 6,376,927 entitled, "Hybrid Electric Drive and Control Method Thereof" to Tamai et al.; U.S. Pat. No. 6,616,569 entitled "Torque Control System for a Hybrid Vehicle with an Automatic Transmission" to Hoang et al.; U.S. Pat. No. 6,823,840 entitled, "Manifold Absolute Pressure Control System and Method for a Hybrid Electric Vehicle" to Tamai et al.; and U.S. Pub. No 2006/0287146 entitled, "Belt Alternator Starter Accessory Drive with Dual Tensioner" to McVicar et al. are incorporated herein by reference in their entirety. The hybrid powertrain systems include belt systems that couple an internal combustion engine to a motor-generator and/or an accessory. Embodiments of the present disclosure detect faults in such belt systems and the like.

Referring to FIG. 1, a functional block diagram of hybrid electric vehicle propulsion system 10 incorporating a diagnostic system 12 is shown. The hybrid system 10 includes an internal combustion engine (ICE) 14, an accessory 16, a belt system 18, a communication system 20, and an electrical power conversion system 22. The belt diagnostic system 12 detects faults in the belt system 18 and/or devices coupled thereto. The accessory 16 is shown as a motor-generator (MG). The accessory 16 may be an alternator, a starter, an air conditioner compressor or other accessory. The hybrid system 10 may also include sensors 24, a memory 26, and an indicator 28.

In operation, the ICE 14 combusts an air and fuel mixture to produce drive torque. The ICE 14 may include any number of cylinders configured in various layouts. For example, the ICE 14 may have 2, 4, 5, 6, 8, 10, 12 or 16 cylinders. Air may be drawn into an intake manifold 30 through a throttle. Air is drawn into the cylinders from the intake manifold 30 and is compressed therein. Air flow into the intake manifold is controlled via a throttle 31. Fuel is injected into the cylinders by a fuel injection system and heat of the compressed air ignites the air/fuel mixture. Exhaust gases are exhausted from the cylinders into an exhaust system. The ICE 14 may be coupled to a transmission 32 and driveshaft 34, as shown.

The accessory 16, when in the form of a MG, has dual functions and performs as either a motor to propel a vehicle or as a generator to charge a battery pack 40. The functions of the accessory 16 are based on the operating state of the hybrid system 10. The operating states may include braking, stopped, operating at a constant speed, or other operating states. The accessory 16 may be an AC induction machine, a DC machine, a synchronous machine, a switched reluctance machine or other machine.

The belt system 18 includes a first pulley 42, a second pulley 44, and a belt 46. The first pulley 42 may be coupled to a crankshaft 48 of the ICE 14. The second pulley 44 may be coupled to an accessory shaft 45 of the accessory 16. The belt 46 is coupled to the pulleys 42, 44 and transfers rotational energy between the ICE 14 and the accessory 16. The belt system 18 may include one or more tensioners. An example of a dual-tensioner system is shown and described with respect to FIG. 2.

The communication system 20 includes an electronic control module (ECM) 50, a powertrain control module 52, an accessory control module 54, and one or more communication buses 56, which may be part of or include a car area network (CAN). The ECM 50 regulates operation of the hybrid system 10. The powertrain control module 52 regulates operation of the ICE 14. The accessory control module 54 regulates operation of the accessory 16 and the power conversion system 22. The control modules 50, 52, 54 may receive sensor status signals from various sensors including sensors 24 and based thereon control operations, such as air injection, fuel injection, cranking, ignition, active state of the accessory 16, and other operating functions. The ECM 50 and/or powertrain controller 52 may be coupled to a brake pedal, a brake-pressure sensor, a brake light, an acceleration pedal, an acceleration pedal sensor, or to other vehicle state altering devices.

The control modules 50, 52, 54 may be microprocessor based such as computers having a central processing unit, memory (RAM and/or ROM), and associated input and output buses. The control modules 50, 52, 54 may be application-specific integrated circuits or may be formed of other logic devices known in the art. The control modules 50, 52, 54 may each be a portion of a central vehicle main control unit, an interactive vehicle dynamics module, a restraints control module, a main safety control module, a control circuit having a power supply, combined into a single integrated control module, or may be stand-alone control modules as shown.

The power conversion system 22 includes the accessory 16, the accessory control module 54 and the battery pack 40. The power conversion system 22 also includes a converter 60, such as a DC-to-DC converter, and low voltage accessories 62. The converter 60 may provide multiple voltage levels for driving the accessory 16 in a motoring operation or a charging and regeneration operation. The converter 60 also conditions and directs electrical power to the low-voltage accessories.

The sensors 24 include an engine speed sensor 70, an accessory speed sensor 72, engine load sensors 74, an accessory torque sensor 76, temperature sensors 78 and other sensors 80. The temperature sensors 78 may include an accessory temperature sensor 82, an engine temperature sensor 84, an intake air temperature sensor 86, or other temperature sensors 88. The other sensors 80 may include, for example, temperature sensors, pressure sensors, flow sensors, oxygen level sensors, and air-fuel sensors for status determination and control of the ICE 14 and the accessory 16.

The memory 26 stores weight factor tables 90 and/or other weight factor information. The weight factor tables 90 may include weight factors associated with engine speed, accessory speed, engine load, accessory torque, accessory temperature, engine temperature, intake air temperature, and other engine and accessory related parameters. Each parameter may have a single associated fixed weight factor or multiple weight factors that are dependent upon that parameter value. The memory 26 may be in the form of read only memory (ROM), random access memory (RAM) or other form of memory.

The indicator 28 may include diagnostic codes, flags or other diagnostic system indicators. For example, the indicator 28 may set an onboard diagnostic code (OBD) upon detection of a fault in the belt system 18. The indicator 28 may include a display, LEDs, audio or video indicators, etc. As another example, the indicator 28 may be a malfunction indicator light or a check engine light.

Figure 2:
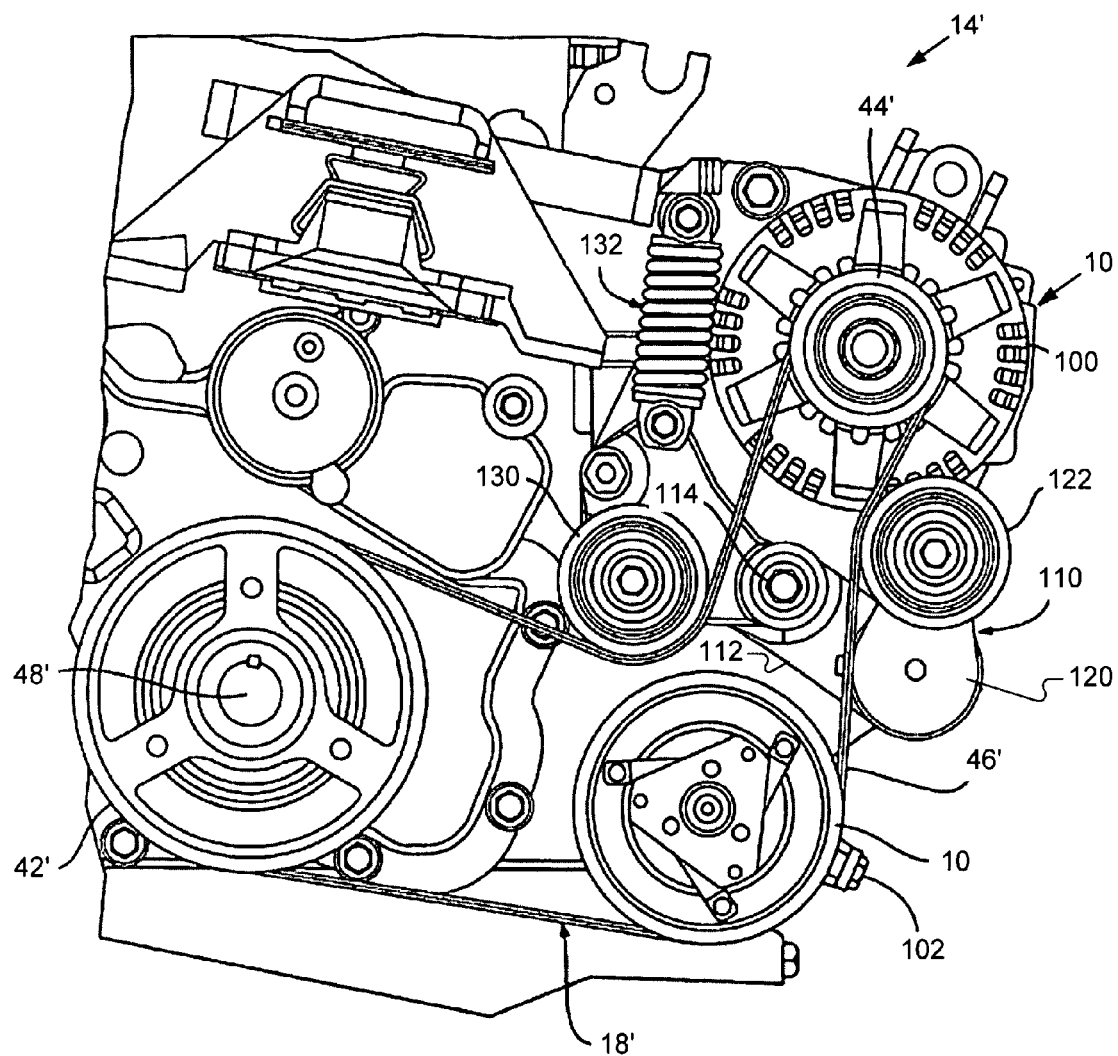
FIG. 2 is a front view of an internal combustion engine with an accessory drive that is operated in association with a diagnostic system in accordance with another embodiment of the present disclosure.

Referring to FIG. 2, a front view of an ICE 14' with an accessory drive that is operated in association with a diagnostic system is shown. The diagnostic system includes the ICE 14', first and second accessories 100, 102, and a belt system 18'. The accessories 100, 102 are shown as an air conditioner compressor and an alternator/starter respectively.

The belt system 18' includes a first 42', second 44' and third pulley 104 and a belt 46'. The first pulley 42' may be coupled to a crankshaft 48' of the ICE 14'. The second pulley 44' is coupled to the first accessory 100. The third pulley 104 is coupled to the second accessory 102. The belt 46' is coupled to the pulleys 42', 44', 104 and transfers rotational energy between the ICE 14' and the accessories 100, 102.

The belt system 18' also includes a dual-tensioner system 110. The dual-tensioner system 110 includes a unitary carrier 112 that has oppositely extending first and second arms fixed to and extending oppositely from a central pivot 114. The pivot 114 is mounted to a support that is fixed to the ICE 14' to permit pivotal motion of the unitary carrier 112 around the pivot 114 and an associated pivot axis.

At the end of the first carrier arm, there is mounted a first tensioner including a first tensioner lever 120 pivotally mounted at one end on a second axis. The first tensioner lever 120 carries at an opposite end a first tensioner pulley 122 rotatably mounted on a third axis spaced from the second axis and the central pivot axis of the unitary carrier 112. All three of these axes are parallel with one another. The tensioner lever first 120 includes a projecting lug, which is adapted to engage stops on the first carrier arm in order to limit pivotal motion of the first tensioner. A housing on the rear of carrier arm encloses a resilient member such as a coil spring, not shown, biasing the first tensioner lever 120.

The second carrier arm carries a second tensioner pulley 130 rotatably mounted on a fourth axis parallel with and spaced generally opposite the third axis such that the tensioner pulleys 122, 130 are positioned generally opposite from the pivot axis. Thus, the first tensioner pulley 122 is biased generally clockwise toward the second tensioner pulley 130.

Also mounted on the second carrier arm, is a second tensioner 132 in the form of a hydraulic strut comprising a central hydraulic cylinder surrounded by a compression coil spring. The strut is connected at a lower eye to the second carrier arm and extends upwardly to an upper eye that, in assembly, is secured to a fixed support, which is fixed to the ICE 14'.

The second tensioner 132 is designed so that the compression spring acts continuously against the upper and lower eyes to bias the cylinder in an extending direction, toward which the cylinder is internally designed to move freely. However, the cylinder includes internal velocity sensitive damping, which limits the rate of compression caused by belt forces acting against the cylinder.

Figure 3:
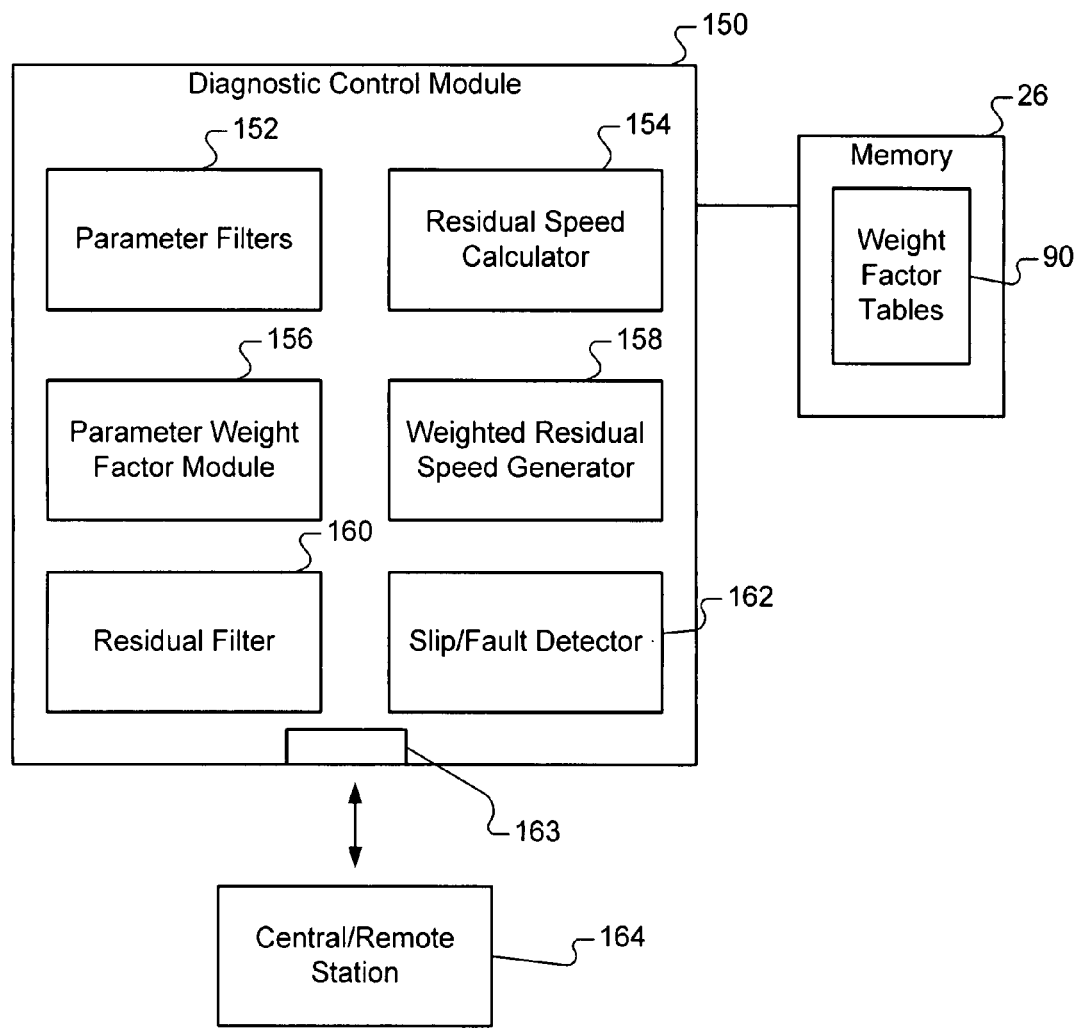
FIG. 3 is a functional block diagram of a diagnostic control module.
Figure 4:
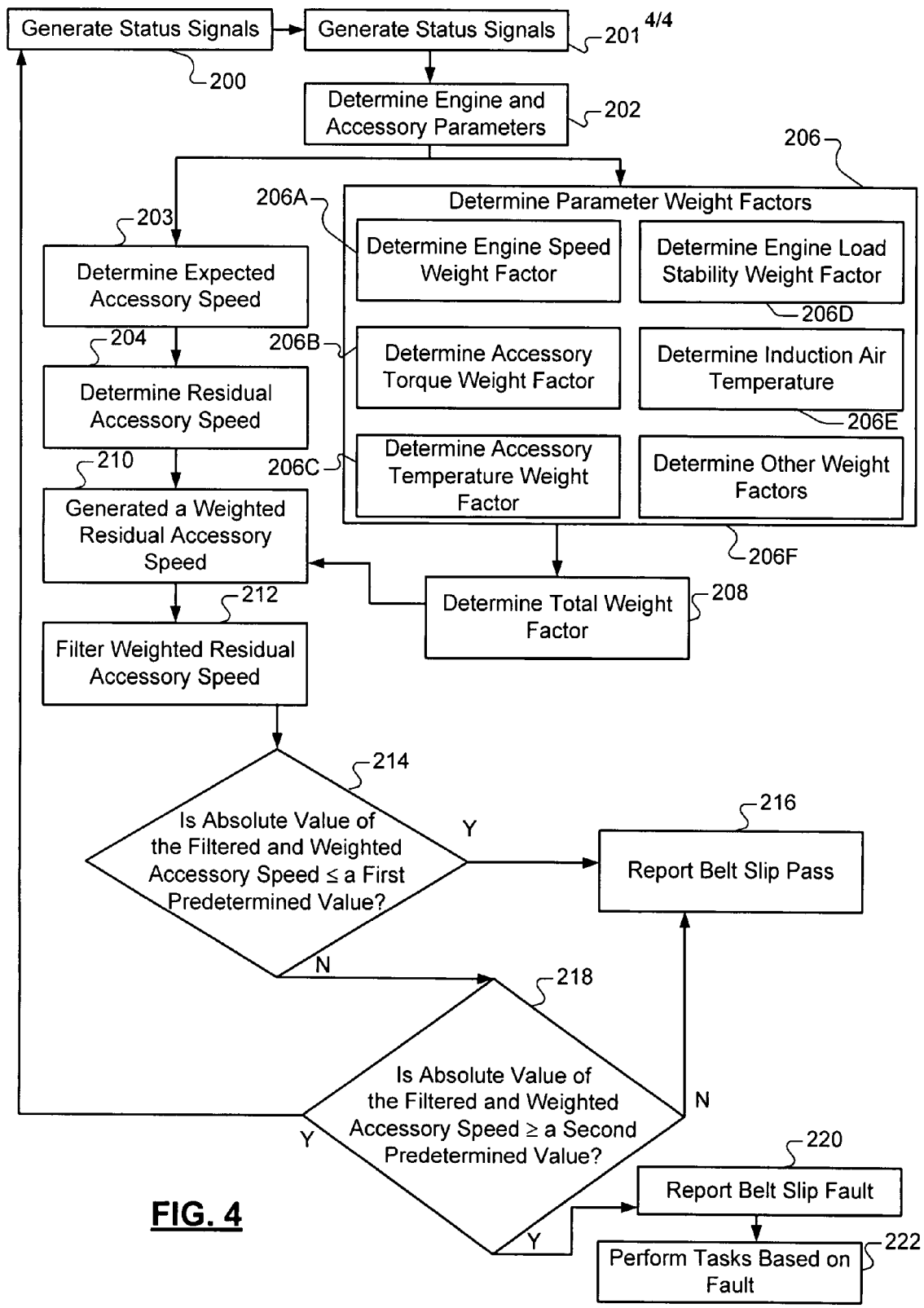
FIG. 4 is a logic flow diagram illustrating a method of operating a diagnostic system in accordance with an embodiment of the present disclosure.

Referring to FIGS. 3 and 4, a functional block diagram of a diagnostic control module 150 and a logic flow diagram illustrating a method of operating a diagnostic system are shown. The diagnostic control module 150 may be in the form of, part of, or combined with one of the above-described control modules 50, 52, 54 or may be a separate control module. The diagnostic control module 150 includes parameter filters 152, a residual speed calculator 154, a parameter weight factor module 156, a weighted residual speed generator 158, a residual filter 160 and a slip/fault detector 162. The diagnostic control module 150 and the stated elements thereof may be software and/or hardware based. The diagnostic control module may have a transceiver 163 for wired or wireless communication to an offboard site and/or remote station 164.

Although the following steps are primarily described with respect to the embodiments of FIGS. 1-3, the steps may be easily modified to apply to other embodiments of the present invention.

In step 200, the sensors 24 generate sensor status signals. The status signals are indicative of engine speed, accessory speed, engine load, accessory torque, engine temperature, accessory temperature, intake air temperature and other parameters. The temperatures may include temperatures in a vehicle engine compartment or under a hood of a vehicle.

In step 201, the status signals are filtered by the parameter filters 152. The parameter filters 152 may include a first order lag filter, a low pass filter, or other filters.

In step 202, the diagnostic control module 150 determines engine speed, actual accessory speed $S_A$, engine load, accessory torque, engine temperature, accessory temperature, intake air temperature and other parameters based on the status signals.

In step 203, the diagnostic control module 150 determines an expected accessory speed or MG speed $S_E$. The expected MG speed $S_E$ may be determined as a function of the engine speed via a fixed ratio. The fixed ratio may correspond to sizes of the pulleys 42, 44. An algorithm to determine the expected MG speed $S_E$ may be based on an assumption that the ratio between speeds of the engine and the MG is fixed under stable engine load conditions. Other algorithms may be used to account for different engine load conditions.

In step 204, the residual speed calculator 154 determines a residual accessory speed or residual MG speed $S_R$ The residual MG speed $S_R$ is determined based on the actual MG speed $S_A$ and the expected MG speed $S_E$. The residual MG speed $S_R$ may be set equal to the actual MG speed $S_A$ subtracted from the expected MG speed $S_E$, as shown by equation 1.

$$S_R = S_E - S_A \tag{1}$$

In step 206, the parameter weight factor module 156 determines parameter weight factors. The weight factors include an engine speed weight factor $W_S$, an accessory (MG) torque delivered weight factor $W_{TQ}$, an accessory (MG) temperature weight factor $W_{TP}$, an engine load stability weight factor $W_L$, an induction air temperature weight factor $W_I$, and other weight factors $W_O$. Steps associated with determination of the stated weight factors are designated 206A-F. The parameter weight factor module 156 may lookup the weight factors in the weight factor tables 90 using information collected from the status signals.

Weight factor windows may be created for each of the parameter weight factors. Each window is associated with a range of values. When a parameter value is outside the associated window, the corresponding weight factor may have a default value of zero. When the weight factor may be set to zero, detection of a fault in the belt system 18 is disabled. As a first example, when the speed of the ICE 14 is greater than a threshold speed or when the ICE 14 is not running (is OFF), the engine speed weight factor may be set to zero. As another example, when temperature of the accessory 16 is greater than a temperature threshold, the accessory temperature weight factor is set to zero. This may occur when the accessory 16 is operating at a non-recommended temperature. Setting a weight factor to zero effectively prevents operating the diagnostic system 12 for a given parameter range. As can be seen by the following steps, when one of the weight factors is set to zero, the diagnostic control module reports a pass.

The diagnostic control module 150 may report when and which weight factor is defaulted to zero. This aids in quickly diagnosing an improperly functioning system. The report may be provided to a vehicle owner, a technician, a central office 164, or other destination via the transceiver 163.

In step 208, the weighted residual speed generator 158 determines a total weight factor $W_{TOT}$. The parameter weight factors are multiplied together to generate the total weight factor $W_{TOT}$, as shown by equation 2.

$$W_{TOT}=W_S*W_{TQ}*W_{TP}*W_L*W_I*W_O \quad (2)$$

In step 210, the weighted residual speed generator 158 determines a weighted residual accessory speed $S_W$ based on the residual accessory speed $S_R$ and the total weight factor $W_{TOT}$. The weighted residual accessory speed $S_W$ is equal to the product of the residual accessory speed $S_R$ and the total weight factor $W_{TOT}$, as shown by equation 3.

$$S_W=W_{TOT}*S_R \quad (3)$$

In step 212, the residual filter 160 filters the weighted residual accessory speed SW to generate a filtered weighted accessory signal. The residual filter 160 may include a first order lag filter, a low pass filter, or other filters. The residual filter 160 may be used to remove spikes, noise, or other signal aspects not of concern. For example, the weighted residual accessory speed signal $S_W$ may have spikes that are associated with the starting of the ICE 14 via an electric motor, such as the accessory 102, which are removed by the residual filter 160.

In step 214, the slip/fault detector 162 compares the absolute value of the filtered weighted accessory signal to a first predetermined value. The absolute value is taken since a belt may have positive or negative slip. The first predetermined value is associated with an appropriate amount of slip for the belt (a pass). In one example embodiment, when the absolute value of the filtered weighted accessory signal is less than or equal to the first predetermined value step 216 is performed, otherwise step 218 is performed. In another example embodiment, when the absolute value of the filtered weighted accessory signal is less than or equal to approximately two (2) then step 216 is performed, otherwise step 218 is performed. In step 216, a pass in indicated. The pass may be indicated via the indicator 28.

In step 218, the slip/fault detector 162 compares the absolute value of the filtered weighted accessory signal to a second predetermined value. The second predetermined value is associated with an inappropriate amount of slip for the belt (a fault). In one example embodiment, when the absolute value of the filtered weighted accessory signal is greater than or equal to the second predetermined value step 220 or 200 is performed. During a first iteration or a preset number of iterations, when the absolute value of the filtered weighted accessory signal is greater than or equal to the second predetermined value the filtered weighted accessory signal may be determined again. Each additional determination may be referred to as a repass. After one or more iterations or determinations of the absolute value of the filtered weighted accessory signal being greater than or equal to the second predetermined value step 220 is performed.

On the other hand, when the absolute value of the filtered weighted accessory signal is less than the second predetermined signal for one or more iterations step 216 may be performed. A repass may also be performed when the absolute value of the filtered weighted accessory signal is greater then or equal to the first predetermined value and less than or equal to the second predetermined value. In another example embodiment, the second predetermined value is equal to approximately twenty-five (25).

In step 220, a fault is indicated. The fault may be indicated via the indicator 28. A fault may be associated with a belt, a set of pulleys, a tensioner, a motor, an accessory, or some other device. The fault may be associated with excessive belt slip, such as from belt wear, improper belt tension, pulley misalignment, a frayed or missing belt, improper operation of an ICE or accessory, or for some other reason. For example, when belt slip is greater than approximately 7% between a crankshaft and an accessory shaft exists, a fault may be detected. The diagnostic control module 150 monitors, detects, and reports faults in the belt system 18 or in a mechanical connection between the ICE 14 and the accessory 16.

In step 222, tasks are performed in response to the detected fault. A fault may be reported to a vehicle owner, a vehicle dealership, a vehicle manufacturer, or to some other central or remote station. The report information may be stored on a vehicle and/or wirelessly communicated and stored elsewhere via the transceiver 163. The stated detection and reporting minimizes vehicle operation when excessive slip exists. This reduces emission output by allowing early detection of excessive slip and repair thereof. In one embodiment, when a fault is detected the diagnostic control module 150 or one of the other control modules 50, 52, 54 limits power/torque output to and out of the accessory 16 by input and output limits. For example, the current provided to the accessory 16 such as for boost and auto start functions may also be limited to 50% normal current provision levels. The current out of the accessory 16 such as for regeneration may be limited to approximately 50% total available output power.

The above-described predetermined values may be fixed and/or calibrated values. The predetermined values may vary per application.

The above-described steps are meant to be illustrative examples; the steps may be performed sequentially, synchronously, simultaneously, continuously, during overlapping time periods or in a different order depending upon the application.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a vehicle comprising:
    a first sensor that generates a first status signal that is indicative of an engine speed of an engine;
    a second sensor that generates a second status signal that is indicative of an actual accessory speed of an accessory that is coupled to said engine via a belt system; and
    a control module that determines an expected accessory speed based on said engine speed, that determines a residual accessory speed based on said expected and actual accessory speeds, and that detects a fault in said belt system based on said residual accessory speed,
    wherein said expected accessory speed is an accessory speed when slip in said belt system is less than or equal to a predetermined slip.

2. A hybrid vehicle system comprising:
    said diagnostic system of claim 1;
    said engine; and
    said accessory,
    wherein said control module generates a weighted accessory speed based on said residual accessory speed, filters said weighted accessory speed, and detects said fault in said belt system based on said filtered weighted accessory speed.

3. The system of claim 2 wherein said belt system comprises:
a first pulley coupled to said engine;
second pulley coupled to said accessory;
a belt coupled to said first and second pulleys; and
a dual tensioner coupled to said belt.

4. The diagnostic system of claim 1 wherein said control module determines at least one weight factor based on a detected state of at least one parameter, determines a total weight factor based on said at least one weight factor, and detects said fault based on said total weight factor.

5. The diagnostic system of claim 4 wherein said control module applies said total weight factor to said residual accessory speed to generate a weighted accessory speed, filters said weighted accessory speed to generate a filtered result, and detects said fault based on said filtered result.

6. The diagnostic system of claim 5 wherein said control module at least one of (i) detects said fault and (ii) determines another residual accessory speed, when said filtered result is greater than or equal to a first predetermined value.

7. The diagnostic system of claim 6 wherein said control module determines said another residual accessory speed when said filtered result is less than or equal to a second predetermined value.

8. The diagnostic system of claim 7 wherein said first predetermined value is associated with detection of a fault, and
wherein said second predetermined value is associated with a permitted slip.

9. The diagnostic system of claim 4 wherein said control module:
determines states of a plurality of parameters;
determines a plurality of weight factors based on said states of said plurality of parameters;
determines a total weight factor based on said plurality of weight factors;
applies said total weight factor to said residual accessory speed to generate a weighted accessory speed;
filters said weighted accessory speed to generate a filtered result; and
detects said fault based on said filtered result.

10. The diagnostic system of claim 9 wherein said control module at least one of (i) detects said fault and (ii) determines another residual accessory speed, when said filtered result is greater than or equal to a first predetermined value.

11. The diagnostic system of claim 10 wherein said states of said plurality of parameters comprise states of (i) a plurality of engine parameters, (ii) a plurality of accessory parameters, and (iii) at least one of an accessory temperature and an engine temperature.

12. The diagnostic system of claim 9 wherein said states of said plurality of parameters comprise states of (i) at least one engine parameter, (ii) at least one accessory parameter, and (iii) a temperature.

13. The diagnostic system of claim 12 wherein said at least one engine parameter includes an engine speed parameter, an engine load stability parameter, an engine temperature parameter, and an induction air temperature parameter.

14. The diagnostic system of claim 12 wherein said at least one accessory parameter includes an accessory torque parameter, a motor-generator torque parameter, an accessory temperature parameter, and a motor-generator temperature parameter.

15. The diagnostic system of claim 12 wherein:
said at least one engine parameter is selected from at least one of engine speed, engine load stability, engine temperature, and induction air temperature, and
said at least one accessory parameter is selected from at least one of accessory torque, motor-generator torque, accessory temperature, and motor-generator temperature.

16. The diagnostic system of claim 12 wherein said control module applies said total weight factor to said residual accessory speed to generate a weighted accessory speed, filters said weighted accessory speed to generate a filtered result, and detects said fault based on said filtered result.

17. The diagnostic system of claim 1 wherein:
speed of said accessory is directly related to speed of said engine; and
said control module determines said expected accessory speed based on said engine speed and a ratio between pulley sizes of said engine and said accessory.

18. The diagnostic system of claim 9 wherein said states of said plurality of parameters comprise states of temperature parameters,
wherein said temperature parameters indicate temperature of said engine and of said accessory.

19. The diagnostic system of claim 1, wherein said expected accessory speed is a predetermined reference speed corresponding to an amount of slip for passing a diagnostic test.

20. The diagnostic system of claim 1, wherein said expected accessory speed is independent of a current amount of slip in said belt system.

21. The diagnostic system of claim 1, wherein said control module:
detects said fault when a weighted amount of said residual accessory speed is less than a predetermined value, wherein said weighted amount of said residual accessory speed is equal to said residual accessory speed multiplied by a weight factor;
does not detect said fault when said weighted amount of said residual accessory speed is greater than or equal to said predetermined value; and
determines that the belt system has passed a diagnostic test when said fault is not detected.

* * * * *